Figure 5:
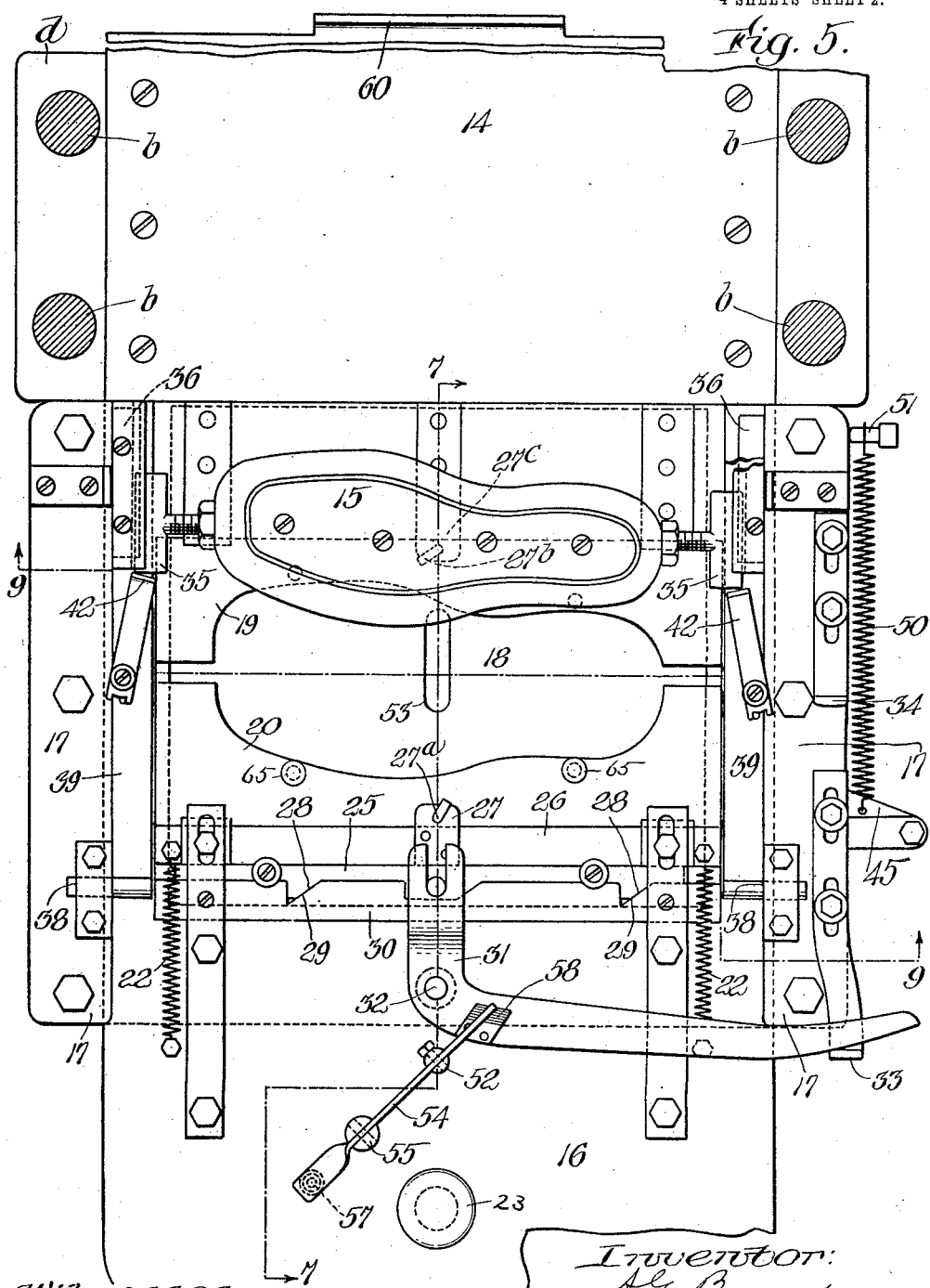

A. G. BREWER.
MACHINE FOR MOLDING SOLES.
APPLICATION FILED OCT. 5, 1912.
1,109,196.
Patented Sept. 1, 1914.
4 SHEETS—SHEET 1.
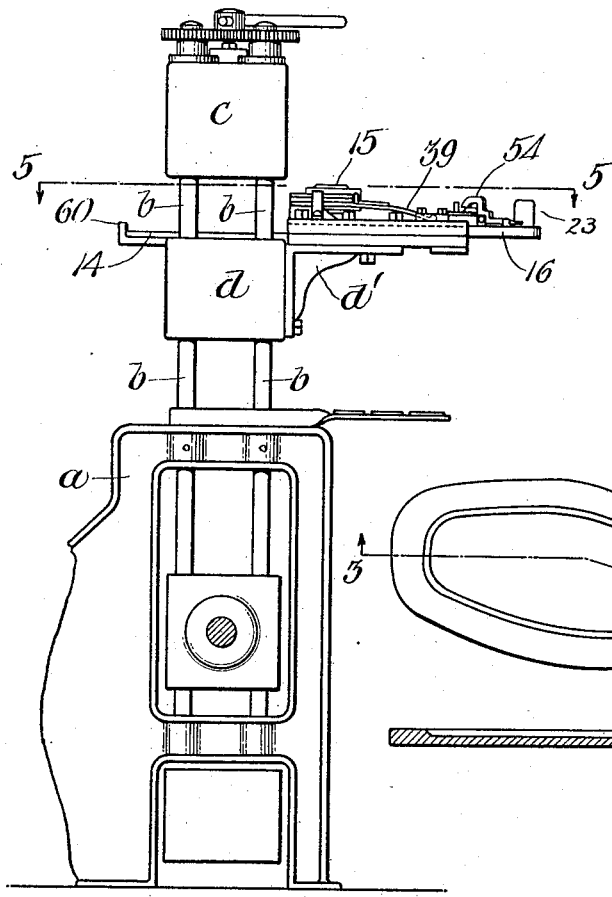
Fig. 1.
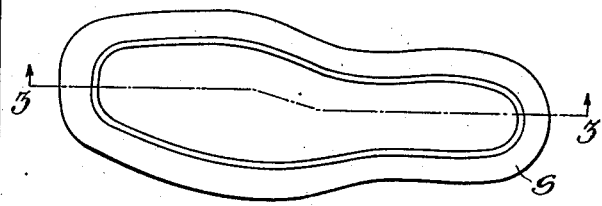
Fig. 2.
Fig. 3.
Fig. 4.
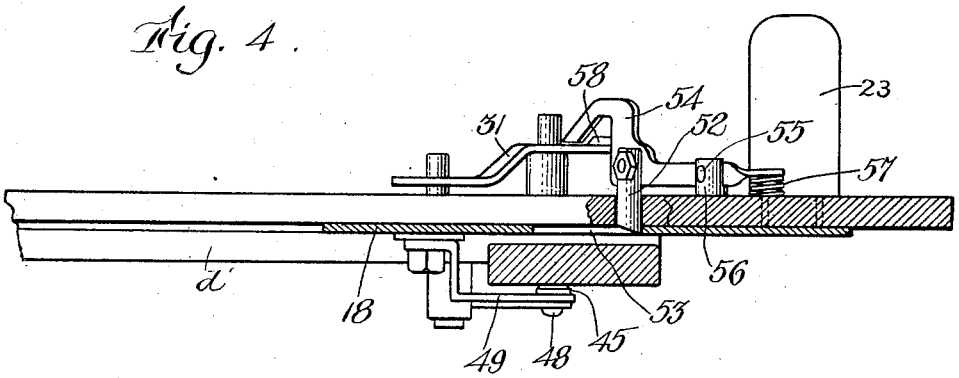
Witnesses:
P. M. Pezzetti
G. E. Johnson
Inventor:
A. G. Brewer
by Wright, Brown, Quinby & May
Attorneys.

A. G. BREWER.
MACHINE FOR MOLDING SOLES.
APPLICATION FILED OCT. 5, 1912.

1,109,196.

Patented Sept. 1, 1914.
4 SHEETS—SHEET 2.

Witnesses:
P. W. Pezzetti
G. L. Johnson

Inventor:
A. G. Brewer
by Wright Brown Quinby May
Attorneys.

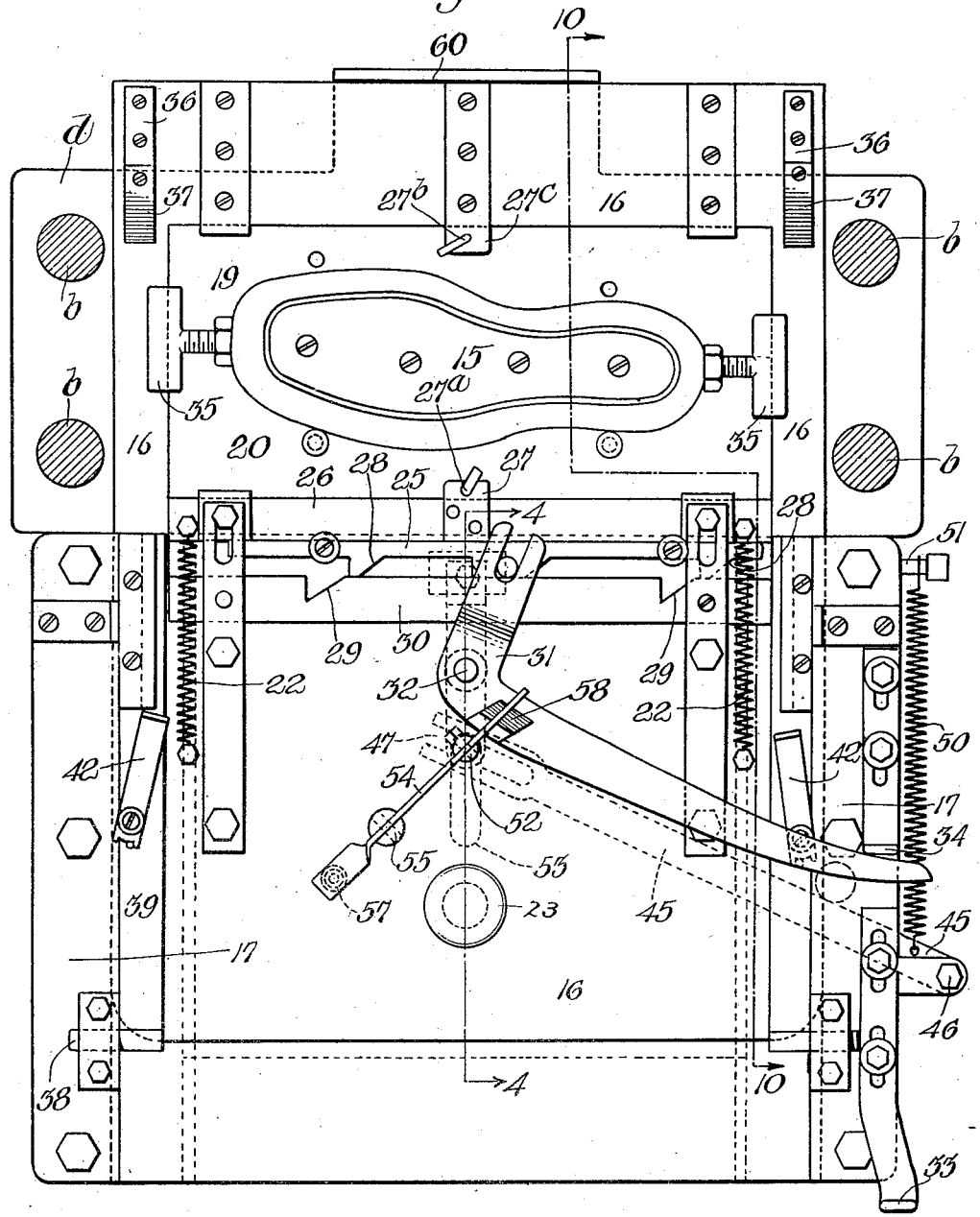

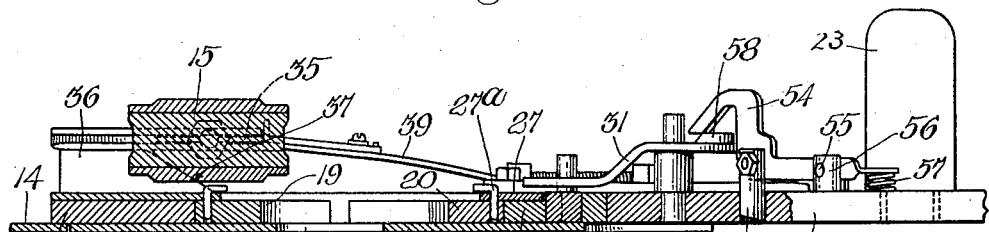
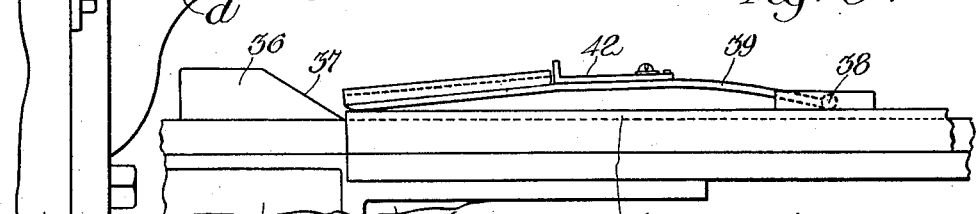
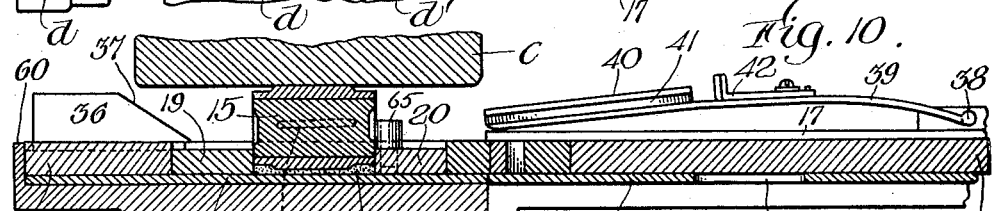

UNITED STATES PATENT OFFICE.

ALBERT G. BREWER, OF NATICK, MASSACHUSETTS, ASSIGNOR TO WELTED SOLE COMPANY, OF BOSTON, MASSACHUSETTS, A CORPORATION OF MASSACHUSETTS.

MACHINE FOR MOLDING SOLES.

1,109,196. Specification of Letters Patent. Patented Sept. 1, 1914.

Application filed October 5, 1912. Serial No. 724,218.

*To all whom it may concern:*

Be it known that I, ALBERT G. BREWER, a citizen of the United States, residing at Natick, in the county of Middlesex and State of Massachusetts, have invented certain new and useful Improvements in Machines for Molding Soles, of which the following is a specification.

This invention has for its chief object to provide a machine for practising the method of molding soles, as set forth in Letters Patent of the United States, No. 1,008,640, granted to William B. Greene, November 14, 1911, said method consisting of confining the edge of a sole-leather outer sole against outward displacement tending to enlarge the area of the sole, and, while the edge is so confined, supporting the entire grain side of the sole and subjecting a portion of the flesh side of less area than the entire area of the sole to pressure, tending to reduce the thickness thereof, while leaving the marginal portion beyond said compressed portion, free to expand in a direction transverse to the face of the sole only, the said pressure and the confinement of the edge of the sole causing a permanent increase in the thickness of said marginal portion.

The present invention is embodied in a machine comprising two pressing members, one movable relatively to the other to compress and release a sole interposed between the members, a mold movable upon one of the members and adapted to confine the edge of an outer sole against outward displacement tending to enlarge the area of the sole, the mold being movable to an operative position between the opposed faces of the pressing members and to an exposed position at one side of said opposed faces to permit the removal and insertion of the work, a loosely mounted pressing die adapted to be inserted in the mold and subject a portion of the flesh side of the sole therein of less area than the entire area of the sole to pressure, tending to reduce the thickness thereof, and means operated by movements of the mold to deposit the die in its operative position in the mold cavity between the opposed faces of the pressing members, so that the sole will be subjected to the described pressure by the movement of one member toward the other, the die being removed from the mold and left in a position at one side of the mold cavity by the movement of the mold to its exposed position. The mold is, therefore, exposed, both before and after the pressing operation, so that a pressed sole may be conveniently removed and another substituted for it, the die being automatically moved to position between the pressing members and on the sole awaiting pressure, and automatically raised from the sole after the pressing operation and left in an inoperative position without obstructing the mold.

The invention is also embodied in a mold adapted to be opened and closed and in automatic means for opening and closing the mold.

Of the accompanying drawings, forming a part of this specification,—Figure 1 represents a side view of a sole-pressing machine, embodying my invention. Fig. 2 represents a plan view of a sole pressed and molded by said machine. Fig. 3 represents a section on line 3—3 of Fig. 2. Fig. 4 represents a section on line 4—4 of Fig. 6, the carrier hereinafter referred to being shown in a position intermediate between the operative and inoperative positions. Fig. 5 represents a section on line 5—5 of Fig. 1, and a plan view of the parts below said line, the carrier and die hereinafter referred to being shown in their inoperative positions. Fig. 6 represents a view similar to Fig. 5, showing the carrier and die in their operative positions. Fig. 7 represents a section on line 7—7 of Fig. 5. Fig. 8 represents a side view of a portion of the machine, the parts being in a position corresponding to that shown in Fig. 4. Fig. 9 represents a section on line 9—9 of Fig. 5, and Fig. 10 is a vertical sectional view on line 10—10 of Fig. 6 showing the parts in the position of pressing a sole.

The same reference characters indicate the same parts in all of the figures.

Referring to Fig. 1, *a* represents a portion of the frame of a pressing machine to which are affixed vertical guide rods *b* projecting above the frame and supporting a fixed head or beam *c*, hereinafter referred to as the upper pressing member.

*d* represents a cross-head having orifices through which the guide-rods *b* pass, the cross-head being reciprocated vertically on the said rods by any suitable mechanism. When the cross-head is raised, an article such as an outer sole *s* interposed between the opposed surfaces of the upper pressing member c and of a lower pressing face 14 attached to the cross-head, is subjected to pressure by the lower pressing face 14 which bears on the under side of the article, and a die 15 bearing on the upper side of the article, and on the under side of the upper pressing member c, said die being moved to and from its operative position, as hereinafter described. The lower pressing face 14, as here shown, is a horizontal plate which may be bolted to the cross-head d, said plate having a flat upper surface, located under the fixed upper pressing member and adapted to support the sole s during the pressing operation, as shown by Fig. 10. Brackets d' are bolted to the frame a, and are adapted to support the mold-carrier and mold hereinafter described, when the mold is in an exposed position at one side of the opposed pressing surfaces of the pressing members, and to guide the carrier and mold to bring the mold into position between the pressing members. 16 represents a carrier which is a flat plate bearing on the brackets d' and movable between guides 17 affixed to said brackets. The carrier has at its inner end portion an aperture containing a mold composed of an inner section 19 and an outer portion 20, the opposed edges of said sections being recessed to form a sole-shaped mold cavity. The mold-receiving aperture is formed to permit the separation of the section 20 from the section 19, as shown by Figs. 5 and 7, thus opening the mold, springs 22 being attached to the outer section 20 and to the carrier, and acting to normally hold the mold open. A sole s deposited in the mold cavity when the carrier is retracted as shown by Figs. 5 and 7, is supported by a sliding bottom plate 18 which is adapted to be displaced, as hereinafter described, to permit the sole to bear on the pressing face 14, and to drop through the mold into a receptacle below it after the pressing operation. The carrier 16 may be reciprocated by hand, a handle 23 being provided, adapted to be grasped by the operator, the carrier being first held in position shown by Figs. 1, 5 and 7, and the mold being opened and exposed at one side of the pressing member c to permit the insertion of a sole in the mold. The carrier is then moved forward to bring the mold under the pressing member c and hold it there during the pressing operation. After the pressing operation the carrier is moved back to its starting position and the mold is automatically opened by the springs 22. Mechanism operated by the forward movement of the carrier to bring the mold to its operative position is provided for closing the mold, said mechanism including a bar 25 adapted to slide cross-wise of the carrier in contact with a strip 26 having an ear 27 secured by a pin 27ª to the outer mold section 20. The bar 25 is interposed between the strip 26 and another strip 30 attached to the carrier 16, so that the bar moves with the carrier and is adapted to move also cross-wise thereof. The bar 25 is provided with inclines 28 which bear on corresponding inclines 29 on the strip 30. With the bar 25 is connected a bell-crank lever 31, pivoted at 32 to the carrier, one arm of said lever projecting between fixed stops 33, 34, on one of the carrier guides 17. When the mold is moved to its open position, as shown by Fig. 5, the lever 31 strikes the stop 33 and moves the bar 25 in the direction required to cause the inclines 28 to permit the mold section 20 and the strip 26 to move away from the mold section 19. When the carrier is moved to the position shown by Fig. 6, the lever 31 strikes the stop 34 and causes a movement of the bar 25 in the opposite direction, so that the inclines 28 and 29 coöperate in closing the mold, this occurring when the mold is in its operative position under the upper pressing member c.

The above-mentioned die 15 is a sole-shaped block having ears 35 at its opposite ends. When the carrier is moved back and in position to receive a sole, as shown by Figs. 5 and 7, the die 15 occupies a raised position at one side of the mold cavity, so that the latter is unobstructed and adapted to receive a sole. The die is automatically shifted from the position shown by Fig. 7, to a position directly over the mold cavity and in contact with the sole, as shown by Fig. 10, when the carrier is moved forward and automatically restored to the position shown by Fig. 7, when the carrier is moved backward, this shifting being accomplished by the means next described.

To the inner end portion of the carrier are attached two cam blocks 36, each having an incline 37. Pivoted at 38 to fixed supports such as the guides 17, are two swinging arms 39, each having at its swinging end a plate 40 provided with a slot 41, said slots being adapted to receive the ears 35 on the die 15, as shown by Figs. 5, 7 and 9. Stops 42 are pivoted at 43 to the arms 39, said stops being adapted to abut against the ears 35, as shown by Figs. 5 and 7. The swinging ends of the arms 39 normally rest on the fixed guides 17, as shown by Figs. 8 and 10, and are raised by the inclines 37, as shown by Figs. 7 and 9, when the carrier is moved backward, said inclines being attached to the carrier.

The parts being in the position shown by Figs. 5 and 7, the mold being open, the ears 35 of the die are in the slots 41, and the arms 39 are supported in raised positions by the cam blocks 36, the die being also raised, and held at one side of the mold cavity by the stops 42. When the carrier is moved forward to locate the mold cavity over the pressing face 14, the arms 39 and the die remain raised until the cam blocks 36 pass from under the arms 39, said arms and the die being thus allowed to drop, the arrangement being such that the die enters the mold cavity and comes to a bearing on a sole $s$ therein before the carrier reaches its extreme forward position. After this the die is moved onward by the mold, its longitudinal edges bearing on the longitudinal edges of the mold cavity, until the carrier reaches the limit of its forward movement, the die being entirely separated from the arms 39 and slots 40, as shown by Fig. 10, the mold and die being located between the pressing members $c$ and $d$. The member $d$ is then raised by the mechanism with which the machine is provided, and the die is caused to indent the upper surfaces of the sole, $s$, as shown by Fig. 10. The pressing member $d$ is then depressed and the operator moves the carrier backward, the die being moved with the carrier by its engagement with the longitudinal edges of the mold cavity, until the ears 35 on the die enter the slots 41 in the plates 40, on the now depressed arms 39. The slots 41 being now inclined, the ears 35 and the die are correspondingly inclined by the movement of the ears into the slots, the outer edge of the die being gradually raised from contact with the mold section 20, and the inner edge of the die remaining in contact with the mold section 19, and being moved thereby. Before the backward movement of the carrier is completed, the inclines 37 of the cam blocks 36 engage the swinging ends of the arms 39, at the same time that the ears 35 abut against the stops 42. The backward movement of the die is thus arrested, and the backward movement of the carrier is continued until the cam blocks 36 raise the arms 39 and the die, as shown by Fig. 7.

The sliding bottom plate 18 which supports the sole in the mold cavity is normally held yieldingly against the face 14 of the lower pressing member, by a lever 45 pivoted at 46 to a fixed support, and having a slot 47 in one end receiving a bolt 48 on a bent arm 49 (Figs. 7 and 9) attached to the plate 18, and a spring 50 connected with the lever 45 and with a fixed support 51. The spring acts through the lever to hold the bottom plate in its sole-supporting position.

The carrier is provided with means for displacing the bottom plate and permitting the pressed sole to drop from the mold when the carrier is moved backward, said means comprising a bolt 52 vertically movable in an orifice in the carrier and entering a slot 53 in the bottom plate 18, a bent lever 54 pivoted at 55 to a post 56 on the carrier, one arm of said lever overhanging the lever 31, a spring 57 (Fig. 4) which presses the overhanging arm and bolt 52 downwardly, and a wedge piece 58 on the lever 31, adapted to raise the overhanging arm and bolt.

When the carrier is first moved backwardly with a pressed sole, the wedge 58 does not engage the bent down end of lever 54, until the outer end of said lever is caused by the backward movement of the carrier to abut against the stop 33 (Fig. 5). The bolt 52 therefore abuts against the outer end of the slot 53 (Fig. 4) and moves the bottom plate backwardly from the pressing member $d$ until it releases the pressed sole. When the lever 31 is moved by the stop 33 to the position shown by Fig. 5, the wedge 58 raises the overhanging arm of the lever 54, and withdraws the bolt 52 from the bottom plate 18, whereupon said plate is restored by the spring 50 and lever 45 to its sole-supporting position.

The lower member $d$ is provided with a stop 60 which limits the forward movement of the carrier.

Each of the mold sections is preferably secured in place detachably so that different mold sections may be used interchangeably and the sections of a pair may be reversed to form a mold for either a right or a left sole, the die being also reversible. The section 20, as already stated, is detachably secured by a similar pin 27$^b$ inserted in an ear 27$^c$ attached to the carrier.

It is obvious that the machine may be used in pressing articles other than soles, although this is the only use I have thus far contemplated.

The die 15 is preferably provided with two flat pressing faces forming opposite sides of the die, and one having the form of a right sole, and the other the form of a left sole, the die being invertible so that it may be used for pressing soles of either form. Each flat pressing face is surrounded by a beveled marginal pressing face 15′ which, when pressed into the sole $s$, tends to crowd the marginal portion of the upper side of the sole outwardly against the wall of the mold cavity.

The flat pressing face, while compressing the portion of the sole on which it bears, also tends to enlarge the area of said portion, the material in contact with the flat face creeping outwardly to a slight extent toward the margin of the sole so that the thickening of the edge of the sole is caused by the conjoint action of the flat face and the beveled face.

The bottom surface of the die 15 and the beveled face 15′ surrounding the same, constitute an upper pressing face opposed to the lower pressing face 14. The lower pressing member, the fixed head or beam $c$ and the die 15, therefore, collectively constitute pressing means having opposed upper and lower pressing faces adapted to decrease the thickness of material interposed between them. The mold formed by the sections 19 and 20, may be called a curb, the walls of the mold cavity acting when the mold is closed to confine or curb the margin of a sole and prevent an increase of its area.

My invention is not limited to the specific mechanism here shown for opening and closing the mold or curb, and for moving the upper pressing face into and from the mold cavity.

The mold section 20 is provided with stops 65 adapted to bear against the rear edge of the die 15, as indicated by Fig. 10, and cause the die to properly register with the mold cavity.

The slotted plates 40 on the swinging arms 39, and the ears 35 on the die 15 constitute separable interengaging members on the swinging end portions of the arms and on the end portions of the die. The cam blocks 36 constitute means operated by movements of the carrier for raising and lowering said arms and die.

My invention constitutes a sole-molding attachment for an ordinary press of the type shown, said press comprising opposed pressing members c d, one of which is movable relatively to the other to exert pressure on an interposed article.

Considered as an attachment, the invention is embodied in a base, such as the bracket d', adapted to be attached to the press member d, said base being provided with the guides 17, and carrying the following instrumentalities, viz., the carrier 18, movable on the base, and provided with the sectional mold or curb, the means for closing and opening the mold, the loosely mounted die 15, and the means for inserting the die in and removing it from the mold, the said base and the instrumentalities carried thereby being applicable to any suitable press of the general character shown. There are several well-known leather presses to which said attachment may be applied, without material modification or adaptation of the press to the attachment.

I claim:—

1. In a machine of the character stated, in combination, an upper and a lower pressing member, one movable relatively to the other to exert pressure on and release an interposed article, a movable carrier provided with a mold which is located by movements of the carrier alternately in an operative position between the opposed faces of the pressing members, and in an exposed position at one side of said faces, a loosely mounted die formed to enter the mold and indent an article therein, and means operated by a movement of the mold to its operative position to insert the die in the mold and leave the die free to be forced into said article, and by a movement of the mold to its exposed position to raise the die and hold it loosely at one side of the mold cavity, leaving the latter exposed.

2. In a machine of the character stated, in combination, an upper and a lower pressing member, one movable relatively to the other to exert pressure on and release an interposed article, a carrier movable upon the lower pressing member and provided with a mold which is located by movements of the carrier alternately in an operative position between the opposed faces of the pressing members and in an exposed position at one side of said faces, a loosely mounted die formed to enter the mold and indent an article therein, swinging arms pivoted to fixed supports, the swinging end portions of the arms and the end portions of the die being provided with separable interengaging members, and means operated by movements of the carrier for raising and lowering said arms and die.

3. In a machine of the character stated, in combination, an upper and a lower pressing member, one movable relatively to the other to exert pressure on and release an interposed article, a carrier movable upon the lower pressing member and provided with a mold which is located by movements of the carrier alternately in an operative position between the opposed faces of the pressing members and in an exposed position at one side of said faces, a loosely mounted die formed to enter the mold and indent an article therein, said die being provided with ears, swinging arms pivoted to fixed supports and provided with slots adapted to engage said ears, and cam blocks moved by the carrier adapted to raise and lower the arms and die, the said arms being provided with die stops.

4. In a machine of the character stated, in combination, an upper and a lower pressing member, one movable relatively to the other to exert pressure on and release an interposed article, a carrier movable upon the lower pressing member, and provided with a mold, which is adapted to be opened and closed, and is located by movements of the carrier alternately in an operative position between opposed faces of the pressing members and in an exposed position at one side of said faces, mold-closing means operated by a movement of the mold to its operative position, the mold being automatically opened when moved to its exposed position, a loosely mounted die formed to enter the mold and indent an article therein, and means operated by a movement of the mold to its operative position to insert the die in the mold and leave the die free to be forced into said article, and by a movement of the mold to its exposed position, to raise the die and hold it loosely at one side of the mold cavity, leaving the latter exposed and open.

5. In a machine of the character stated, in combination, an upper and a lower pressing member, one movable relatively to the other to press and release an interposed article, a carrier movable on the lower pressing member and provided with a mold composed of an inner section movable with the carrier and an outer section movable with the inner section and independently thereof to open and close the mold, the outer section being normally separated yieldingly from the inner section to open the mold, a bar movable with the carrier and independently thereof crosswise of the carrier, means operated by movements of the carrier for moving said bar crosswise of the carrier alternately in opposite directions, the bar and the outer mold section being provided with complemental means whereby said movements of the bar alternately close and permit the opening of the mold, the movements of the carrier alternately locating the mold in an operative position between the opposed faces of the pressing members, and in an exposed position at one side of said faces, a loosely mounted die formed to enter the mold and indent an article therein, and means operated by a movement of the mold to its operative position to insert the die in the mold and leave the die free to be forced into said article, and by a movement of the mold to its exposed position to raise the die and hold it loosely at one side of the mold cavity leaving the latter exposed and open.

6. In a machine of the character stated, in combination, an upper and a lower pressing member, one movable relatively to the other to exert pressure on and release an interposed article, a carrier movable upon the lower pressing member, and provided with a mold which is adapted to be opened and closed, and is located by movements of the carrier alternately in an operative position between opposed faces of the pressing members and in an exposed position at one side of said faces, mold-closing means operated by a movement of the mold to its operative position, the mold being automatically opened when moved to its exposed position, a loosely mounted die formed to enter the mold and indent an article therein, said die being provided with ears, swinging arms pivoted to fixed supports and provided with slots adapted to engage said ears, and cam blocks moved by the carrier, adapted to raise and lower the arms and die, said arms being provided with die stops.

7. In a machine of the kind described, a sole indenting die having an active face with a substantially smooth continuous sole-shaped main central portion, a beveled portion surrounding and encircling said central portion, and a relatively rabbeted substantially flat peripheral portion surrounding said beveled portion, adapted to compress the central portion of the sole while leaving the peripheral portion substantially thicker and relatively uncompressed; and a curbing mold with a flat face adapted to coöperate with said die to produce a welt around the periphery of a sole confined therein, said mold having a peripheral wall adapted to confine the periphery of the sole and being substantially at right angles to the plane of the sole, said beveled portion of the die being adapted to press the material of the sole outwardly and into the corners of the mold.

8. A machine of the character stated, comprising pressing means having opposed lower and upper faces adapted to reduce the thickness of material interposed between said faces, a curbing mold movable on the lower pressing face and having a cavity of larger area than the upper pressing face, said mold being adapted to be opened and closed, means for moving the mold alternately to an operative position between the pressing faces and to an exposed position at one side of said faces, and means operated by said movements of the mold for closing the mold when it is moved to its operative position, and for opening the mold when it is moved to its exposed position.

9. A machine of the character stated, comprising pressing means having opposed lower and upper faces adapted to reduce the thickness of material interposed between said faces, a curbing mold movable on the lower pressing face and having a cavity of larger area than the upper pressing face, said mold being adapted to be opened and closed, means for moving the mold alternately to an operative position between the pressing faces and to an exposed position at one side of said faces, means operated by movements of the mold for opening and closing the latter, and means for moving the upper pressing face into and out of the mold cavity.

10. A sole-molding attachment comprising a base adapted to be attached to one of two opposed pressing members of a press of the character stated, said base having guiding means, a movable carrier guided by the base and provided with a mold which is located by movements of the carrier alternately in an operative position between the opposed pressing members and in an exposed position at one side of said members, a loosely mounted die formed to enter the mold and indent an article therein, and means operated by a movement of the mold to its operative position to insert the die in the mold and leave the die free to be forced into said article, and by a movement of the mold to its exposed position to raise the die and hold it loosely at one side of the mold cavity leaving the latter exposed.

11. A sole-molding attachment comprising a base adapted to be attached to one of two opposed pressing members of a press of the character stated, said base having guiding means, a movable carrier guided by the base and provided with a mold which is adapted to be opened and closed, and is located by movements of the carrier alternately in an operative position between the opposed pressing members and in an exposed position at one side of said members, mold-closing means operated by a movement of the mold to its operative position, the mold being automatically opened when moved to its exposed position, a loosely mounted die formed to enter the mold and indent an article therein, and means operated by a movement of the mold to its operative position to insert the die in the mold and leave the die free to be forced into said article, and by a movement of the mold to its exposed position to raise the die and hold it loosely at one side of the mold cavity leaving the latter exposed.

In testimony whereof I have affixed my signature, in presence of two witnesses.

ALBERT G. BREWER.

Witnesses:
 E. L. BROOKS,
 M. A. BROOKS.

---

Copies of this patent may be obtained for five cents each, by addressing the "Commissioner of Patents, Washington, D. C."